(12) United States Patent
Zarick et al.

(10) Patent No.: US 10,936,631 B2
(45) Date of Patent: Mar. 2, 2021

(54) PERSON CENTRIC APPLICATIONS

(71) Applicant: Microsoft Technology Licensing, LLC, Redmond, WA (US)

(72) Inventors: Richard W. Zarick, Seattle, WA (US); Allison O'Mahony, Bellevue, WA (US); Ross Nathaniel Luengen, Sammamish, WA (US); Brian Daniel Beck, Woodinville, WA (US); Song Zou, Bellevue, WA (US); Gregory Thomas Mattox, Jr., Bellevue, WA (US); Carmen Quan, Bellevue, WA (US); Shane Wyatt Zamora, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 425 days.

(21) Appl. No.: 15/130,628

(22) Filed: Apr. 15, 2016

(65) Prior Publication Data

US 2017/0300555 A1    Oct. 19, 2017

(51) Int. Cl.
*G06F 16/28* (2019.01)
*G06F 16/9535* (2019.01)
(Continued)

(52) U.S. Cl.
CPC .......... *G06F 16/288* (2019.01); *G06F 3/0481* (2013.01); *G06F 16/24573* (2019.01); *G06F 16/9535* (2019.01); *G06Q 10/103* (2013.01)

(58) Field of Classification Search
CPC ............. G06F 17/30604; G06F 3/0481; G06F 17/30525; G06F 17/30867; G06Q 10/103
(Continued)

(56) References Cited

U.S. PATENT DOCUMENTS 7,370,290 B2    5/2008  Grossman et al.
7,433,920 B2   10/2008  Blagsvedt et al.
(Continued)

FOREIGN PATENT DOCUMENTS

WO    2006092647    9/2006

OTHER PUBLICATIONS

International Search Report and the Written Opinion issued in PCT Patent Application No. PCT/US2017/026477 dated Jul. 11, 2017.
(Continued)

*Primary Examiner* — Hosain T Alam
*Assistant Examiner* — Nicholas E Allen
(74) *Attorney, Agent, or Firm* — Workman Nydegger

(57) ABSTRACT

Implementing people as operating system level objects. A method includes, for a user logged in to an operating system, identifying a person with a relationship to the user. For the person, the method further includes identifying information, including information that can be used to communication with the person. The method further includes storing the information related to the person in a data store that is a global data store with respect to the operating system such that the information related to the person can be accessed at the operating system level. The method further includes using the information related to the person stored in the data store to identify applications or services that can be used to communicate with the person. The method further includes displaying in a user interface for the person an enumeration of applications or services that can be used to communicate with the person.

21 Claims, 9 Drawing Sheets

(51) Int. Cl.
*G06F 16/2457* (2019.01)
*G06Q 10/10* (2012.01)
*G06F 3/0481* (2013.01)

(58) Field of Classification Search
USPC .......................................................... 707/737
See application file for complete search history.

(56) References Cited

U.S. PATENT DOCUMENTS

| | | | |
|---|---|---|---|
| 8,463,831 B2 | 6/2013 | Harris et al. | |
| 8,805,450 B2 | 8/2014 | Wen et al. | |
| 9,930,773 B2* | 3/2018 | Holbery | H05K 1/0272 |
| 2003/0217073 A1* | 11/2003 | Walther | G06Q 10/109 |
| 2006/0010206 A1* | 1/2006 | Apacible | H04M 3/436 |
| | | | 709/205 |
| 2006/0045029 A1* | 3/2006 | Ethier | H04L 12/1818 |
| | | | 370/260 |
| 2009/0030878 A1* | 1/2009 | Weir | G06F 16/335 |
| 2010/0011304 A1 | 1/2010 | van Os | |
| 2012/0192075 A1* | 7/2012 | Ebtekar | H04L 12/6418 |
| | | | 715/738 |
| 2012/0200607 A1* | 8/2012 | Ross | G06F 3/04815 |
| | | | 345/676 |
| 2013/0080546 A1* | 3/2013 | Souza | H04L 12/6418 |
| | | | 709/206 |
| 2014/0095254 A1* | 4/2014 | Chauhan | G06Q 30/0201 |
| | | | 705/7.29 |
| 2014/0115480 A1* | 4/2014 | Lundgren | G06F 9/451 |
| | | | 715/733 |
| 2014/0157138 A1 | 6/2014 | Kuscher et al. | |
| 2014/0179280 A1* | 6/2014 | Seaman | H04W 4/50 |
| | | | 455/414.1 |
| 2014/0344721 A1 | 11/2014 | Prakash | |
| 2014/0365917 A1 | 12/2014 | Luna et al. | |
| 2015/0033219 A1* | 1/2015 | Breiner | G06F 8/61 |
| | | | 717/178 |
| 2015/0067805 A1* | 3/2015 | Martin | H04L 67/1095 |
| | | | 726/7 |
| 2015/0089359 A1 | 3/2015 | Brisebois | |
| 2015/0199367 A1* | 7/2015 | Hammer | G06F 16/125 |
| | | | 707/654 |
| 2015/0215365 A1* | 7/2015 | Shaffer | H04L 65/80 |
| | | | 370/252 |
| 2015/0286387 A1 | 10/2015 | Gu et al. | |
| 2015/0286650 A1* | 10/2015 | Stump | G06Q 50/01 |
| | | | 705/319 |
| 2015/0312180 A1* | 10/2015 | Taler | H04L 51/046 |
| | | | 715/752 |

OTHER PUBLICATIONS

"People app help", Retrieved on: Mar. 12, 2016 Available at: http://windows.microsoft.com/en-in/windows-8/people-app-faq.

* cited by examiner

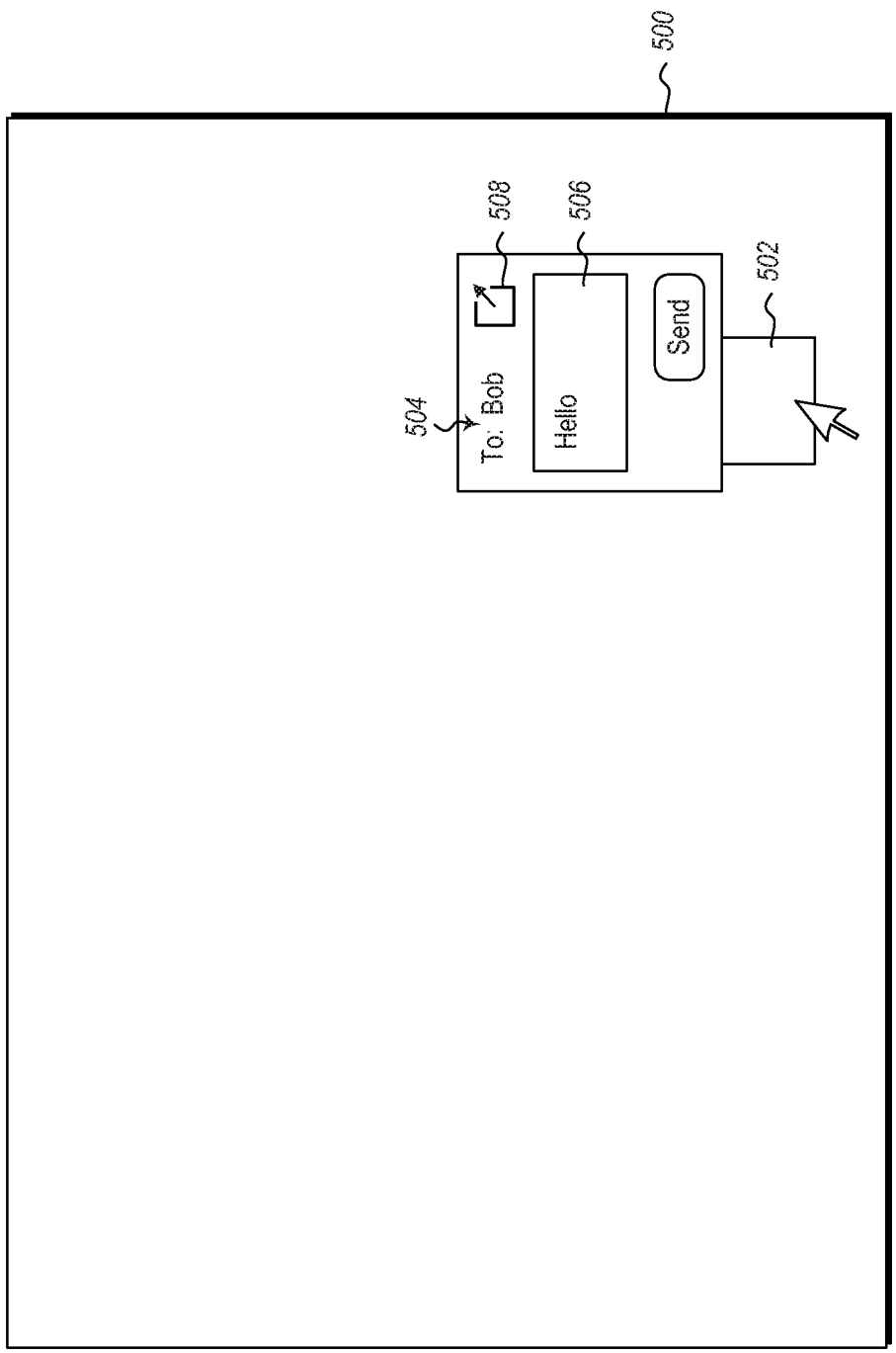

PERSON CENTRIC APPLICATIONS

BACKGROUND

Background and Relevant Art

Computers and computing systems have affected nearly every aspect of modern living. Computers are generally involved in work, recreation, healthcare, transportation, entertainment, household management, etc.

Users use a multitude of different applications and services to communicate and collaborate with people across their work and life. For example, users may use e-mail applications to communicate with other users. Users may use instant messaging services to communicate with other users. Users may use applications accessible to other users to collaborate with other users. Users may identify other users in various pieces of data. For example, a user may tag another user in a photo or video.

Communication experiences are silo'd by their backing applications and services. This requires a user to check multiple applications and sites to stay informed and connected with respect to a given people or sets of people. Computer users, therefore, have to manage and track communications across these multiple applications and services.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a computing environment The method includes acts for implementing people as operating system level objects. The method includes, for a user logged in to an operating system, identifying a person with a relationship to the user. For the person, the method further includes identifying information related to the person. The method further includes storing the information related to the person in a data store that is a global data store with respect to the operating system such that the information related to the person can be accessed at the operating system level. The information includes communication application information or service information identifying applications or services identified to the operating system that can be used to communicate with the person. The method further includes using the information related to the person stored in the data store to identify a plurality of applications or services that can be used to communicate with the person. The method further includes displaying in a user interface for the person an enumeration of applications or services that can be used to communicate with the person.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 5A illustrates an example of a system implementing a lightweight version of an application;

DETAILED DESCRIPTION

Some embodiments described herein illustrate how a person can be treated as an operating system level construct such that a person or group of people are treated in a fashion similar to a file, application, directory, folder, or other operating system level construct. In particular, a person can be represented in a store that is global with respect to an operating system such that the person can be treated like other operating system level constructs. For example, if an operating system uses a registry to register operating system level constructs, a person can be registered in the registry. For example, in a registry, there may be a top level key for 'people'. A given person may be a lower level key within the top level key 'people'. A person may be associated, in the lower level key in the registry, with certain attributes such as name, address, age, gender, relationships with other people, applications that can be used to communicate with the person, applications that the person uses to collaborate with other people, applications for which metadata is stored about the person, files for which metadata is stored about the person, etc.

By storing this information at an operating system accessible level, people can be tightly integrated with other operating system level constructs. Thus for example, a user of an operating system could open a person in a fashion similar to how the user of the operating system would open a file or application. In this way, a user could quickly and efficiently identify information about a person and communicate with a person in a person centric way rather than trying to gather information about the person by using a multitude of applications and services, each of which contains some individual piece of information about the person. This could allow for extremely efficient user interfaces to be created for users to be able to gather information about, and communicate with, a person without needing to track what individual applications and services contain information about the person. Additionally, this could help to eliminate potentially missing or losing desired information about a person. In summary, embodiments may be able to quickly take action related to a person whether that is to communicate, share or any other action where the person is at the center of the task. Thus, a technical effect could be realized that includes more efficient interfaces for identifying information about a person, such as information identifying how to communicate with a person, how to collaborate with a person, what metadata exist about a person, etc. Additionally, efficient means of taking action with respect to a person exist. Embodiments may be implemented where there is no need to go through multiple applications, rather a user can just go to the person and take the action there.

Figure 1:
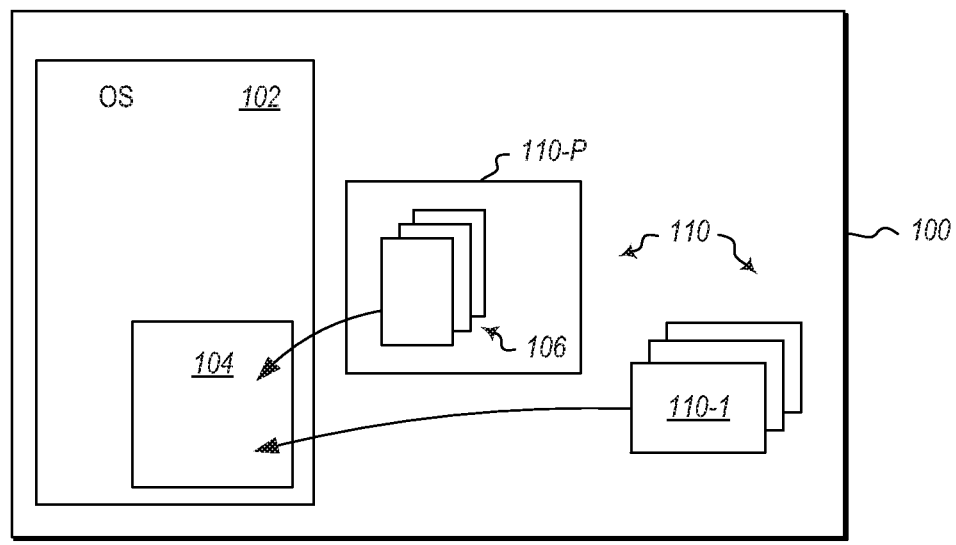
FIG. 1 illustrates a system implementing people as operating system level objects.

Referring now to FIG. 1, a system 100 is illustrated. The system 100 includes an operating system 102. Within the operating system is a global storage structure 104. That global storage structure 104 stores data in a fashion that allows for operating system level access to the data stored in the global storage structure 104.

If an application 110-1 wishes to access data from the global storage structure 104, the application 110-1 will need to go through the operating system 102 to obtain access to the data stored in the global storage structure 104.

Note that applications 110 are registered with the global storage structure 104. Also note that people 106 are registered with the global storage structure 104.

As noted previously, in some embodiments, information about people may be stored in the global storage structure 104. Thus for example, the global storage structure 104 may store for a given person: name information, or other identifier, such as a random identifier, service driven identifier such as a handle or username, etc., address information, age information, gender information, relationships information, applications information identifying applications that can be used to communicate with the person, applications that the person uses to collaborate with other people, files that are associated with the people, and/or other information. Thus, in the illustrated example in FIG. 1, a representation of a given person is stored at an operating system level and thus becomes accessible to various system components and applications in a fashion similar to other operating system level objects. Various attributes stored at the operating system level will now be discussed with additional detail.

As noted above, in some embodiments relationships information about a person may be stored in the global storage structure 104. Such relationship information may be, for example, relationship information related to a user of an operating system. Thus, for example, a user may be logged in to the operating system 102. The global storage system 104 may include an entry for a person. That entry may include information identifying relationship information between the person logged into the operating system 102 and the person with an entry in the global storage structure 104. Thus for example, the relationship information may identify the person identified in the global storage structure 104 as a boss of the person logged into the operating system 102. Alternatively, the relationship information stored in the global storage structure 104 may identify the person in the global storage structure 104 as a parent or child of the person logged into the operating system 102. Various other relationships can be identified about a person in the global storage structure 104 within the scope of embodiments of the present invention.

Some embodiments may include quality factor for various relationships. For example, embodiments may track that a user knows a person across various identities and services. For example, a user may be able to communicate with a person Bob on Twitter, Instagram, Kik, What's App, Xbox, Facebook, phone and email. Embodiments can infer that the user has a stronger relationship with Bob as compared to Nancy the user only has an email address and phone number for her. This information can be used for various purposes, such as highlighting or emphasizing people with stronger relationships to the user as compared to other people. For example, people with stronger relationships to the user may be more prominently displayed in the people bar. Alternatively, the strength of a relationship to a user may be indicated by highlighting or other user interface elements.

As discussed above, the global storage structure 104 may further include applications and identity information and/or service information identifying applications and/or services that can be used to communicate with the person within an entry for a person in the global storage structure 104. For example, the global storage structure 104 may have an entry for a person where the entry can identify e-mail clients, text applications, instant messaging applications, video chat applications, etc., that have been identified with the global storage structure 104 of the operating system 102 that can be used by a user logged into the operating system 102 to communicate with the person identified in the global storage structure 104. Thus, applications that can be used to communicate with the person are identified at an operating system level within the person as opposed to the person being identified individually within each application or service that may be used to communicate with the person. Note that in some embodiments, only applications that are installed on the system 100 are identified in the global storage structure 104. However, in other embodiments, other applications may be identified. For example, the global storage structure may identify other applications or platforms that a person can be contacted on even if no means exists on the system 100 to use the other applications or platforms.

As illustrated previously, applications that the person uses to collaborate with other people may be identified within an entry for a person in the global storage structure 104. For example, if a person is registered with certain word processing applications, spreadsheet applications, database applications, whiteboard applications, or other applications or services (e.g., Office 365 or Google Docs) used to collaborate with other people, an entry for that person may be maintained in the global storage structure 104 that identifies the various applications and/or services which the person is registered to collaborate with other people.

As illustrated previously, files that are associated with a given person may be identified within an entry for a person in the global storage structure 104. For example, if a person has been tagged in an image file, that image file can be identified in an entry for the person in the global storage structure 104. Similarly, if a person has been identified as an author on a document file, that document file may be identified in the entry for the person in the global storage structure 104. Although not enumerated here, other metadata may be identified in an entry for a person in the global storage structure 104.

Figure 2:
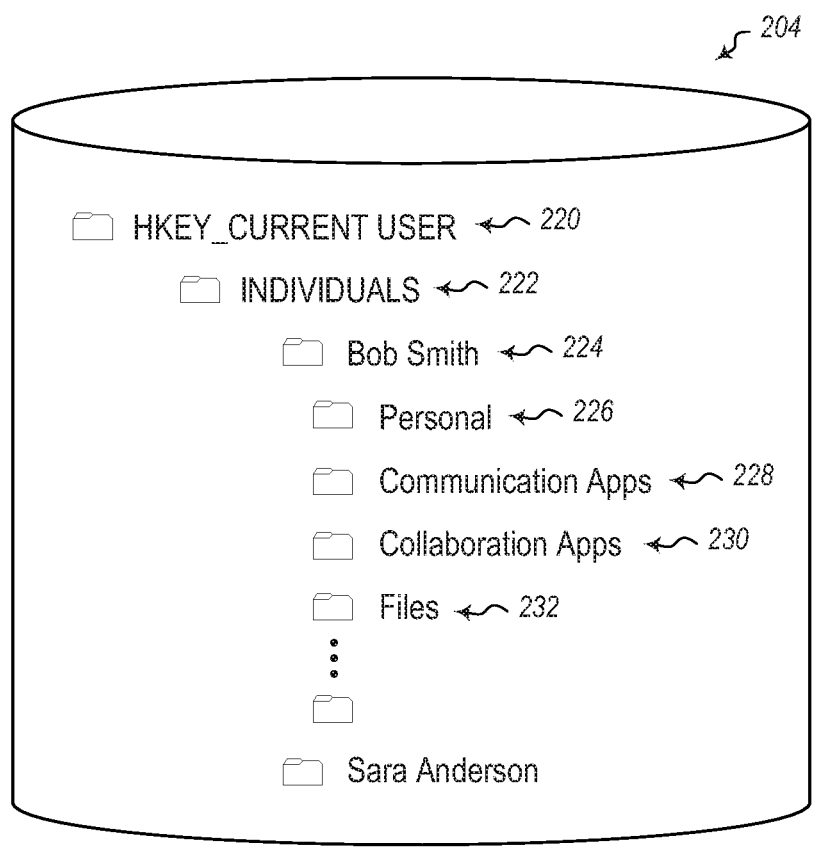
FIG. 2 illustrates a database showing people stored as operating system level objects in the database.

Various examples of global storage structures such as the global storage structure 104 will now be illustrated. With reference to FIG. 2, a global storage structure in the form of a registry 204 is illustrated. Such a registry may be available in various operating systems available from Microsoft Corporation of Redmond, Wash. The registry 204 includes various registry keys. The registry keys can be used to store information accessible at an operating system level such that data stored in the keys may be accessible by the operating system.

In the example illustrated in FIG. 2, an upper level key 220 is illustrated. Below the upper level key 220, is a people key 222. The people key 222 includes entries for different people. In particular, the people in the people key 222 may be people with some relationship to a user logged in to the operating system 102 (see FIG. 1).

In the example illustrated and FIG. 2, a person entry 224 is shown for a person named Bob Smith. Hierarchically below the person key 224 are a number of attribute keys.

For example, a personal attribute key 226 is included. The personal attribute key 226 may include information such as name, address, phone number, age, gender, etc.

Another attribute key 228 is a communications applications attribute key. The communications applications attribute key 228 identifies applications and services that can be used to communicate with the person Bob Smith. For example, the communications applications attribute key 228 may identify various e-mail applications, instant messaging applications, video conferencing applications, or other applications and/or services that are installed on the system 100 and registered with the operating system 102 (or in some embodiments, may not be installed on the system 100 but it is known that the person can be contacted using these applications and/or services) that may be used by a person logged on to the operating system 102 to communicate with the person Bob Smith.

FIG. 2 further illustrates a collaboration applications and services attribute key 230. The collaboration applications and services attribute key 230 may store information such as applications and services for which the person Bob Smith has been registered to collaborate with other users. For example, the applications attribute key 230 may identify word processing, spreadsheet, data management, whiteboard, or other applications or services installed on the system 100 and registered with the operating system 102 (or in some embodiments even applications that are not installed and registered) that can be used to collaborate with the person Bob Smith. In some embodiments, the collaboration applications attributes key 230 may only identify those applications for which Bob Smith uses to collaborate with the user presently logged into the operating system 102.

FIG. 2 further illustrates a files attribute key 232. The files attribute key 232 includes information identifying files on the system 100 for which there is metadata about the person Bob Smith. For example, the files attribute key 232 may identify image files where Bob Smith has been tagged in the image file. Alternatively or additionally, the files attribute key 232 may identify files in which Bob Smith is a document author.

While not illustrated here, other information may be stored in a person key 224 for Bob Smith (or other people).

Figure 3:
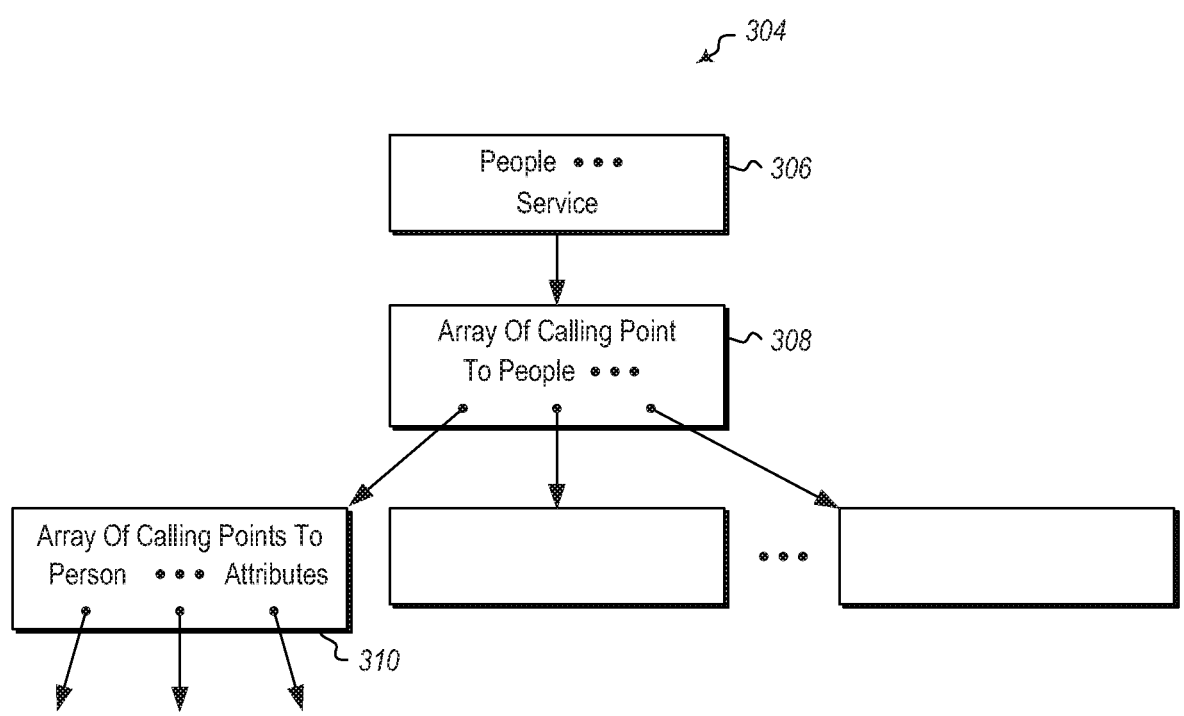
FIG. 3 illustrates an object graphs used to store people as operating system level objects.

Referring now to FIG. 3, another example is illustrated. FIG. 3 illustrates an example of an object graph 304 that may be used as the global storage structure 104. For example, embodiments may use an object graph such as the core data object graph provided in iOS available from Apple Corporation of Cupertino, Calif.

The object graph 304 includes various nodes and connections among the various nodes. For example, FIG. 3 illustrates a people service node 306. The people service node 306 is coupled to a people node 308 which includes an array of calling points to people. This particular node 308 includes calling points to various people implemented at an operating system level. FIG. 3 illustrates that the people node 308 points to, for example the person node 310. The person node 310 points to an array of calling points to person attributes. In this way, an object graph 304 can be used to store information about people at an operating system level.

Note that embodiments may use operating system level configuration files in various embodiments of the invention. Further note that some embodiments may use database storage and configuration files. For example, consider a case where a Unix® system is running on a Windows® system. In such cases, both a database and configuration files may be used.

Figure 4A:
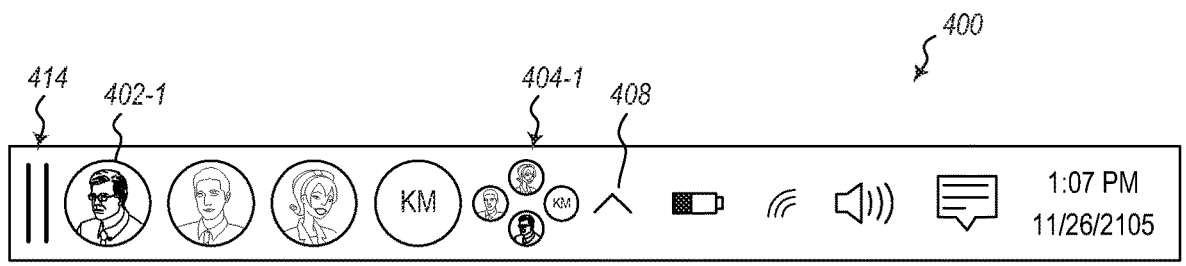
FIG. 4A illustrates an example of the people bar.

By storing people at an operating system level, embodiments can implement a number of useful and unique people based user interface elements. For example as illustrated in FIG. 4A, embodiments may implement a "people bar" 400. A people bar 400 is a control for displaying people in a bar similar to how a taskbar is displayed. In some embodiments, the people bar 400 may be part of the taskbar. Alternatively, the people bar 400 may be a separate user interface display element separate and distinct from the taskbar. The people bar 400 can contain people (contacts), such as the person 402-1 and groups such as the group 404-1. Generally, the functionality of the people bar 400 may be similar to the taskbar 406.

Figure 4B:
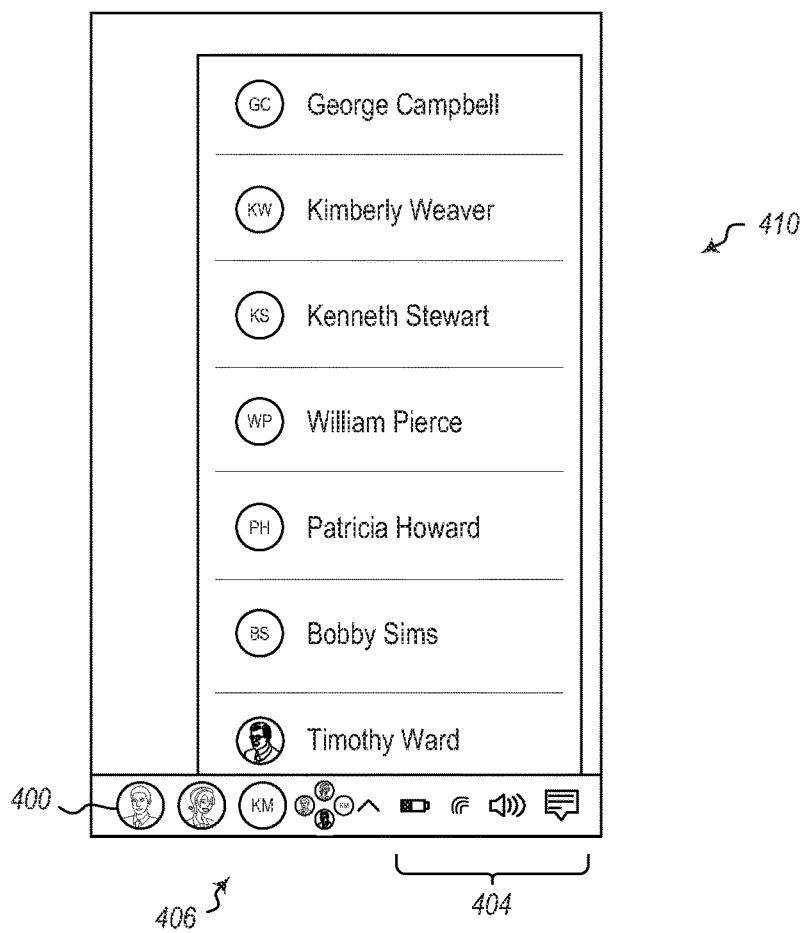
FIG. 4B illustrates an example of an overflow fly-out window for the people bar.

Users can pin people or groups to the people bar 400 from a people application 110-P and/or other communication applications, a people start view (e.g., when people are represented as Start menu objects such as in the Start menu available from Microsoft Corporation, of Redmond, Wash.), or from the people bar 400 itself. As illustrated in FIG. 4B, the people bar 400 may be placed ahead of the system tray area 404 on a taskbar 406. The people bar 400 may be implemented to not take up visual space on the taskbar 406 when the people bar 400 is empty.

Users may be able to explicitly show or hide the people bar 400 on the taskbar 406 similar to other toolbars. It may also appear in the list of available toolbars. The people bar 400 may also auto resize similar to toolbars, when other areas of the taskbar 406 are being resized. If a user explicitly chooses to hide\disable the people bar 400 that preference may be respected until they manually change it. Various visual elements may be implemented for the people bar 400. For example, the people bar 400 may have a transparent and\or color background; representations for a person or group; overflow affordance (when there are more items than can be displayed); overflow fly-out; context menus; a resizing gripper; a button flashing\needy state; background color; etc. These will be examined in more detail below.

The background of the people bar 400 may match the rest of the taskbar 406 based on the user's settings. The people bar 400 may have the ability to be a transparent or solid color. It may also support blur if blur is supported on the taskbar 406. In particular, the people bar 400 may include the ability to adapt to the hosted environment so that it seamlessly fits in with other user interface elements.

The representation of a person may match that of pinned person on other menu or user interface elements, such as the Start menu available from Microsoft Corporation, of Redmond Wash. Generally it may be the contact photo for that person. The photo may come from a contact database and be scaled as appropriate to fit into the available space.

The representation of a group may match that of a pinned group on other menu or user interface elements, such as the Start menu available from Microsoft Corporation, of Redmond Wash. For example, the representation of a group may generally be a collage of the contact photos of the people contained in the group or the designated photo for the group. The photo may come from a contact database and be scaled as appropriate to fit into the available space.

In some embodiments, hovering over a person or group shows the name for that contact or group.

An overflow button 408 may be displayed when there are more items in the people bar 400 than can be visibly displayed based on its current size. The visuals representation for the button may be comprised of the visual representations of the people or groups in an overflow fly-out. In some embodiments, there must be at least one person or group that cannot be displayed before the overflow button 408 is displayed, meaning the overflow fly-out contains at least two items. An alternative embodiment includes placing suggested people and groups into the overflow in addition to people that do not fit on the people bar 400.

Some embodiments may show the people and groups along a ring, Elements may be added to the ring in the order in which they would appear on the people bar 400 if it was resized and ordered clockwise.

As illustrated in FIG. 4B, when users click\tap the overflow button 408, an overflow fly-out window 410 appears containing people and groups which are pinned to the taskbar 406 but not currently displayed. The people and groups in the fly-out window 410 may be laid out in an n×1 grid (n rows, 1 item per row). If there are more than some predetermined number of items in the overflow fly-out window 410, a scrollbar may be added to the overflow fly-out window 410 allowing users to scroll. The bottom of the overflow fly-out window 410 may cut across the last visible row signifying there is more content below. Users may be able to scroll while the height of the window remains the same.

Some embodiments may have special treatment for recent contacts. In particular, recent contacts may be placed in a prominent position on the people bar 400 or in the overflow fly-out window 410. In some embodiments, the recent contacts may be identified as recent contacts by labeling them as such, highlighting them in a predetermined way, or in some other fashion.

Figure 4C:
FIG. 4C illustrates a context menu for the people bar.

Some embodiments may implement a context menu 412 as illustrated in FIG. 4C. For example right clicking on a person or group in the people bar 400 displays a context menu 412 for that item. In particular, the context menu 412 is a menu of actions that can be taken on a person object. The context menu may contain a way to pin or unpin that person or group from the people bar 400. The context menu 412 may alternatively or additionally contain actions for opening to a default view (which may include, for example, a contact card etc.) for that person or group and an action to close the window. The context menu 412 may include actions for finding and displaying all documents related to and/or from the given person\group and seeing previous communication history between the current user and the given user\group Some embodiments may include a resizing gripper 414 as illustrated in FIG. 4A. Users can use the resizing gripper 414 to resize the people bar 400. When all taskbars are not locked users can decide how much space may be devoted to a particular toolbar on the taskbar 406. This can give the user control over how much space or how prominent the people bar 400 should be when sharing visual space with other system level components In some embodiments, users may not be able to resize the bin smaller than the amount of space necessary to display at least two items. If there are more than two items on the people bar 400 then users may not be able to make it smaller than the amount of space necessary to show one item (active window) and the overflow button 408. If the toolbar needs to grow to show the required elements due to user pinning people or groups to the taskbar 406 then the people bar 400 may grow to the left (right for RTL languages) to accommodate. As expected this may automatically reduce the space available for toolbars to the left of it.

When the user has not specified a size for the toolbar, it may automatically grow to show some predetermined number of pinned items including the overflow button (e.g., up to 5 items in landscape and 3 in portrait orientation). Note that this may be user configurable in some embodiments. The size of the toolbar may automatically reduce as items are removed.

Some embodiments may implement a button flashing\needy states. A people application 110-P can make a representation or button for a person or group flash when it needs to get a user's attention. Applications participating in the people application 110-P may be able to inform the people bar 400 that it needs to flash the button\icon for a specific person. Use of this functionality may be limited to not annoy users and the button may only flash for a short period of time and then leave the button in a highlighted state.

In some embodiments, the people bar 400 may only accept the command to flash the representation\button if there is an inactive or minimized window for that person or group. The application requesting the representation\button to be flashed does not have to be the current channel for that person.

Embodiments may include the ability to add or remove people or groups.

Embodiments may include a people based application 110-P. Users can pin people and groups using the people based application 110-P. People and groups pinned to the taskbar 406 from the people based application 110-P are added to the people bar 400. The people based application 110-P calls an API provided by the people bar 400 to add or remove a person or group to or from the people bar 400. Deleting a contact or group also removes it from the people bar 400.

Embodiments may include functionality for integrating with other applications. Users may be able to pin people and groups using communications related applications registered (or identified in a configuration file) with a social extensibility framework. People and groups pinned to the taskbar 406 from those applications are added to the people bar 400. Applications can call an API provided by the people bar 400 to add or remove a person or group to or from the people bar 400. Deleting a contact or group also removes it from the people bar 400.

Some embodiments may include an interstitial page where the user confirms they want to pin a person or group to the people bar 400, similar to pinning web pages. This is to prevent $3^{rd}$ party applications from abusing the pinning API.

Some embodiments may implement drag and drop reordering. Users may be able to rearrange people and groups on the people bar 400 using drag and drop. User can rearrange items displayed on the people bar 400 as well as items in the overflow. Users can also move a person from the overflow to the displayable region and vice versa.

To move a person from the displayed region of the toolbar to the overflow fly-out window 410 a user would drag the person to the overflow button 408 and either drop them there to place them in the front of the overflow list in the overflow fly-out window 410 or hover until the overflow fly-out window 410 is open and place them where they want.

Figure 4D:
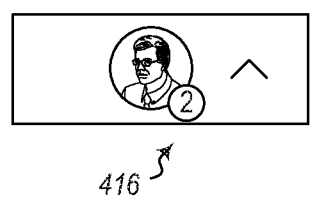
FIG. 4D illustrates an example of a badge counter used in the people bar.

Embodiments may implement notification badges. When a person or group is pinned to the people bar 400 and new notifications related to that person or group are received, a badge 416 (see FIG. 4D) displaying the total number of new notifications may be shown on top of the representation of that person or group on the people bar 400. The people bar 400 may subscribe to notification system events to know when new notifications are available for a given person or group.

Some embodiments may implement notifications for people in the overflow. When a people bar item requiring a new or updated notification badge is not currently being displayed, because it's in the overflow, the overflow button 408 may flash and rest on a highlighted state to indicate to the user that there are new notifications for a pinned person in the overflow. Once the overflow fly-out window 410 is opened, the contact with the new notification may have a notification badge on it.

Some embodiments may implement group policy customizations. For example, embodiments may facilitate enabling and disabling the people bar 400. Enterprises may be able to enable or disable the people bar 400 and related functionality using group policy. One or more of the following may be supported: enabling and disabling showing the people bar 400 in the taskbar 406 toolbar list; enabling and disabling the pin to taskbar 406 option for people and groups; adding and removing people and groups; or other functionality.

Enterprises may be able to add or remove people and groups to the people bar 400 using group policy. One or more of the following may be supported: adding and removing a person from the people bar 400 using an identifier; adding and removing a group from the people bar 400 using the identifier or name of the group; or other functionality.

Embodiments may integrate a person or communication based application with a person or group on the people bar 400. For example, with reference now to FIG. 4E, in some embodiments, left clicking or tapping a person in the people bar 400 may display a people panel 418 for that person; an application like experience built around that person. The people panel 418, in some embodiments, may be centered above the clicked or tapped person. For example, the people panel 418 may generally behave like a window and allow the user to move it around anywhere on the screen and support arbitrary resizing. The people panel 418 may also show up in a task switcher and task view and users can have panels open for more than one person at a time.

The people panel 418 frame, in the illustrated example, has two main components: a custom title bar header 420 and an application hosting frame 422.

In the illustrated example, the custom title bar header 420 has three sections: caption controls 424, person context, and a switcher menu. The shell can build and render everything in the custom title bar header 420.

The custom title bar header 420 for the people panel 418 has a caption control 424 to minimize the people panel 418 to the people bar 400. In the illustrated example, the people panel 418 does not have a control to maximize the panel to take up the full screen (however users can resize the window as they see fit). Additionally, some embodiments may include the control to maximize the panel.

The custom title bar header 420 for the people panel 418 will have a section 426 of the custom title bar header 420 focused on the person and context to which the panel is set. For example, this section 426 may contain the name of the person, a photo representation of the person, a visual indicator of the context\channel and an optional informational status line.

Hosted applications can provide an informational status line to be shown when the user is on that channel. Typically this line would show presence status information in the case of instant messaging applications or disambiguation information such as email address in the cases where a single contact could have multiple accounts\identifiers such as with email addresses and mail applications.

The custom title bar header 420 for the people panel 418 may have an entry point 428 for switching between hosted application experiences. Clicking the gentry point 428 will open a transient user interface that lists the available hosted application experiences (channels) for that person.

Each entry in the list may have two pieces of information: an icon and a name. Hosted applications can also provide an optional secondary informational line, similar to the informational line exposed in the person context section in the custom title bar header 420.

Icons in the switcher can be badged to inform users if there are active notifications for the given person inside that application experience.

The majority of the people panel 418 is the hosted application frame 422 shown below the custom title bar header 420 in the illustrated example. Applications registered to host experiences in the people panel 418 will be responsible for building application views appropriate for hosting in the panel.

While applications will be responsible for their overall hosted experience, the content displayed in the pane can be centered around the identified person or group.

Embodiments may include functionality for launching into a full applications. For example, as described below, the people panel 418 may be a rich minimized application, which is an economized version of a full application. In particular, in some embodiments, when an application is installed on the system, two different and distinct versions of the application may be installed, with each their own functionality (alternatively, the same application can be launched in two different distinct contexts). Specifically, the economized version of the application does not need the full version of the application to be running for the economized version to function. Thus, the economized version is not simply a reduced view of the full application, but is itself an application with some shared functionality of the full application. In some embodiments of the invention, the economized version of the application and the full version of the application may be configured to transfer context information on a switch between the versions of the application.

For example, from a hosted application experience in the people panel 418, users may be able to pop out into a full application. When launching into the full application from the people panel 418, context and continuity may be maintained so that the user ends up in an expected place and does not lose any work or context. In particular, the economized version of the application (e.g. the people panel 418) can communicate context information and current data processing to the full version of the application such that the full version of the application can begin functioning in an equivalent logical position as the economized version of the application was in when switching to the full version of the application. The people panel 418 may automatically close when the user launches into the full application.

If the entry point for this is in the header, the hosted application may be responsible for providing a URI to the host so that embodiments can navigate the user to the correct place within the application.

Applications participating in the people panel 418 may be able to inform the people bar 400 that they need to flash the button\icon for a specific person. Use of this functionality may be limited to not annoy users and the button may only flash for a short period of time and then leave the button in a highlighted state. In some embodiments, the people bar 400 will act on the command to flash the representation\button if there is an inactive or minimized window for that person or group.

Because the application requesting the representation\button to be flashed does not have to be the current channel for that person, the hosted application can inform the host if the icon for the application may be badged in the switcher with an alert or attention badge to direct users to the right channel. If the switcher is not automatically exposed embodiments will badge the switcher button to alert users to information below.

In some embodiments, the shell will remember the last channel\hosted application experience that was open for a given person or group and return the user to that channel\experience the next time the user opens the panel for that person from the people bar 400.

If the user launches into the panel with a known contextual entry point such as messaging this person using a messaging application, the panel may be opened to that application channel\experience automatically.

When a person or group is displaying a notifications badge, left clicking or tapping on that person or group may show the overflow fly-out window 410 with a notifications button with a badge number. Once all of the notifications are handled the notifications button may no longer show and the badge may be removed. If all of the notifications are not handled then the notification section and badge count may be updated as appropriate.

When a person or group is in the people bar 400, a user may be able to share items with that person or group by dropping an item or set of items onto the representation of that person or group in the people bar 400. An item can be shared using transports such as on-line storage (such as One Drive available from Microsoft Corporation of Redmond, Wash.), email or messaging (such as Skype available from Microsoft Corporation, of Redmond, Wash.).

Action Center and the Dynamically built person applications can be built using views from different communication and non-communication applications, where those applications are hosted inside the dynamic person application 110-P which allows those applications and service to participate in the experience without providing APIs or some other way to connect to their service. Hosting applications inside the dynamically built person applications also insulates the experience from service API changes A people start view may include sections for both recent contacts and all contacts and users can pick up conversations with a person directly from a Start menu or similar type menu.

Note that embodiments may be implemented where a person can be registered in a registry or identified in a configuration file in a fashion that allows the person to be included at an operating system level across multiple devices. For example, many modern operating systems interact across multiple devices for a particular user. If a user registers a person in one version of the operating system, such as the desktop version of the operating system, the person will automatically be registered in a different version, such as a cellular telephone version of the operating system. This allows the person to be registered across multiple devices. In some embodiments, a user may be able to have a mobile phone experience on a desktop by using the lightweight version 502 of the application.

In some embodiments, the person can be registered by the applications that can be used to interact with a person. For example, if a person has an account on a particular social media platform, chat platform, text platform, cellular network, etc., these can each be identified in the person's operating system level identification. For any corresponding applications that are installed on a system in which the person is registered, notifications can be indicated indicating whether or not the user is available through that particular application and or platform. If the user is identified at the operating system level with a platform or application that is not installed on the system, indications can be shown indicating that this is a way to contact or interact with a person, but the indication may be shown in a fashion that illustrates that this application or platform is not available on the particular system. For example, the indication may be grayed out indicating that while the person would normally be able to be contacted through a grayed out application or platform (if installed at the system), they cannot be contacted on the particular system using the application or platform as it is not available on the system.

In some embodiments, user interface mechanisms may be provided to allow a user to select a displayed application or platform to install the application or platform from a particular person's representation. For example, FIG. 4E at 430 illustrates a number of applications and platforms that can be used to communicate with a person. A grayed out application could be indicated here. The user of the system could select the grayed out application and would then have the opportunity to install an application that could then be used to communicate with the user person in yet another form.

Note that some embodiments may include functionality for showing which applications and platform the person is currently available on. For example, embodiments may show when a user is logged on to a particular social media platform, when the user is available by a particular chat platform, and may even include functionality for showing when a user is available on a cellular network. For example, embodiments may have information about when a user's cell phone pings a cell tower which would indicate that the user was available on the cellular network. In this way, a user can efficiently select the best means to communicate with a particular person implemented as an operating system level object. In some embodiments, a representation such as that illustrated at 430 in FIG. 4E could be enhanced to show a person's availability using the various applications. For example, an application may be highlighted in a particular way, such as using one or more of brightness, color, text, borders, or other highlighting.

Some embodiments of the invention may implement rich minimized views. A rich minimized view is a lightweight version of an application. Thus in some embodiments, when a rich minimized view is used, two versions of an application will be installed on a system. For example, a rich minimized view application with reduced functionality will be installed along with a full function application.

Figure 5B:
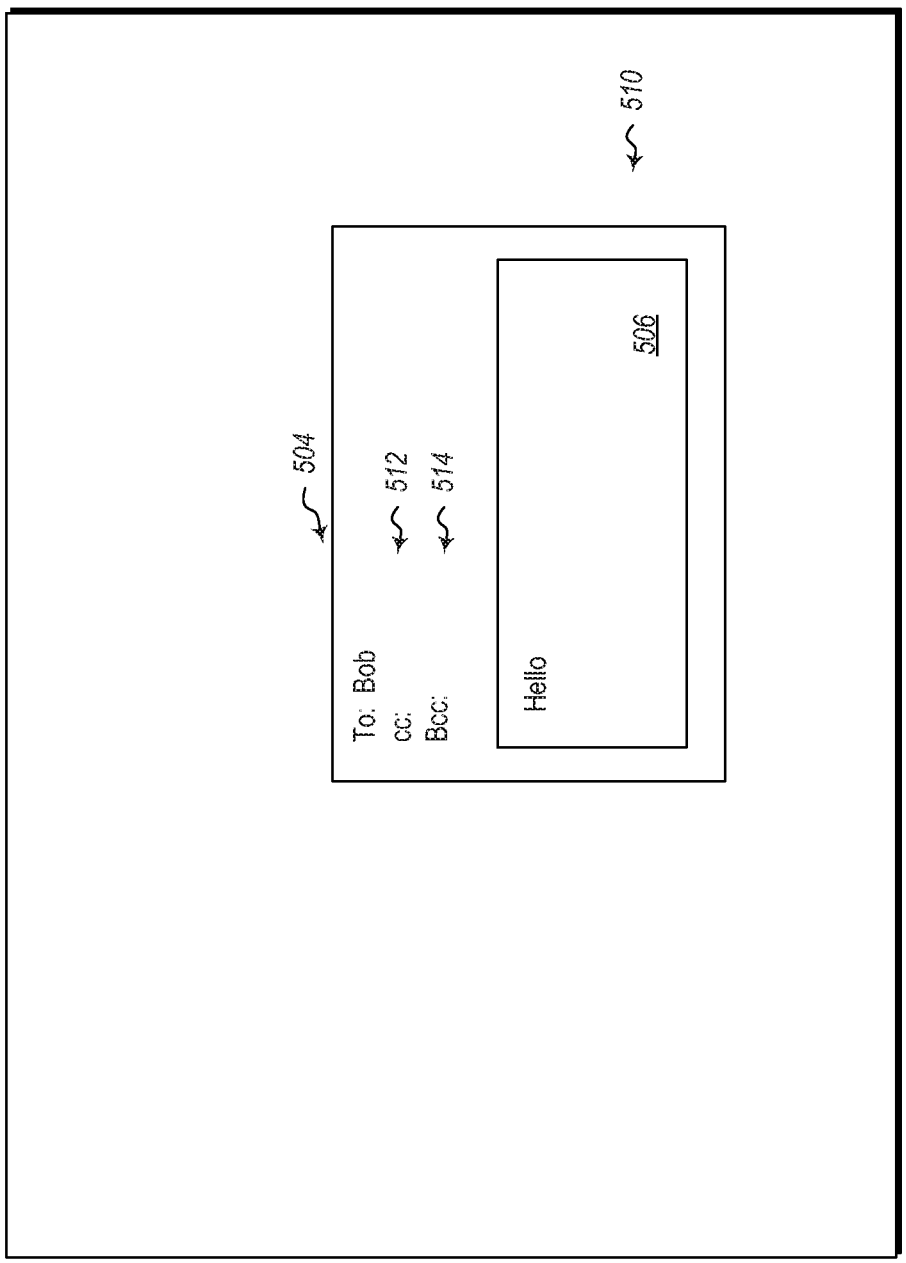
FIG. 5B illustrates an example of the system implementing a full version of an application.

Referring now to FIG. 5A, an example is illustrated. FIG. 5A illustrates a system 500. The system 500 includes a lightweight version 502 of an application. The lightweight version 502 of the application includes some limited amount of functionality. For example, the lightweight version 502 of the application may include only the most used functions. Note that in some embodiments, a user may be able to select which functions will be available in the lightweight version 502 of the application. For example a user may select in a full version 510 (see FIG. 5B) of the application what functions to include in the lightweight version 502. The code to implement these functions will be added to the lightweight version 502 of the application.

Embodiments may limit the number of functions that may be added. This may be limited by a number of functions. In an alternative embodiment, the lightweight version 502 of the application may have a maximum size. A user may only add functions until an amount of functional code has been added to the lightweight version 502 that it reaches its maximum size.

In the illustrated example, the lightweight version 502 of the application is an email program which includes functionality for sending and receiving messages. However, the lightweight version 502 of the application in the illustrated example is only able to provide limited functionality when sending emails. For example, in the illustrated example, a user is only able to enter information into the 'to' field 504 and a 'text' field 506. However, using the lightweight version 502 of the application, a user is unable to enter carbon copy and blind carbon copy information.

The lightweight version of the application includes an entry point 508. The entry point causes a full version 510 of the application to be launched as illustrated in FIG. 5B. The full version 510 of the application allows a user to enter information in the 'to' field 504 a carbon copy field 512 and a blind carbon copy field 514, in addition to being able to enter text in the text field 506.

Note that when implementing rich minimized views, a lightweight version of an application can be implemented along with a full version 510 of the application. Note however, that the two versions 502 and 510 are in fact separate applications having separate code. Indeed, in some embodiments the versions 502 and 510 are sandboxed from each other in most respects. In particular, embodiments may be implemented where the lightweight version 502 and the full version 510 each have code that runs independently.

However, embodiments may be able to pass context between the two versions of the application. For example, if a user is reading an email in the lightweight version 502 of the application when they selected the entry point 508, then the full version of the application 510 will open in a window where the user can continue reading e-mail that was being read in the lightweight version 502 of the application. In the example illustrated in FIGS. 5A and 5B, a user is sending an e-mail when the user selects the entry point 508. This causes the full version 510 of the application to open with the same context and maintaining any data that was previously entered in the lightweight version 502 of the application. That may be done by the lightweight version 502 providing messaging to the full version 510 to allow the full-version to have appropriate context and data. In some embodiments, messages may be sent between the versions which includes the data. In alternative embodiments, data may be stored in a particular data store available to both versions of the application.

In the example illustrated, the user may identify that they need to include carbon copy recipients and blind carbon copy recipients, and thus may need to open the full version 510 of the application. By selecting the entry point 508, the user still maintains whatever data they have entered into the email form which is persisted into the full version 510 of the application, but now the user is able to enter the additional information that they would like to enter.

Note that using rich minimized views, and using modern operating systems which allow sharing across different devices, rich minimized views can be implemented across different devices. In particular, an application can be registered across multiple devices. For example, the lightweight version 502 of the application may be installed on a user's cellular phone. When the user selects the entry point 508, the full version 510 of the application can launch on the user's desktop device. Note however that a user may have a lightweight version 502 of the application installed on their mobile phone device, and an additional instance of the lightweight version 502 of the application installed on their desktop device, and the full version 510 of the application installed on the desktop device. In this way, a user can have a version that consumes less resources on a resource limited device, but still have the ability to switch from the resource limited device to a more resource rich device (such as a desktop or laptop computer) while still maintaining context from the lightweight version 502 of the application implemented on the resource limited device.

With reference to the people embodiments above, the hosted application frame 422 maybe a lightweight version of an application. Selecting the entry point 428 may cause a separate full version of the application to be launched when rich minimized views are implemented.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 6:
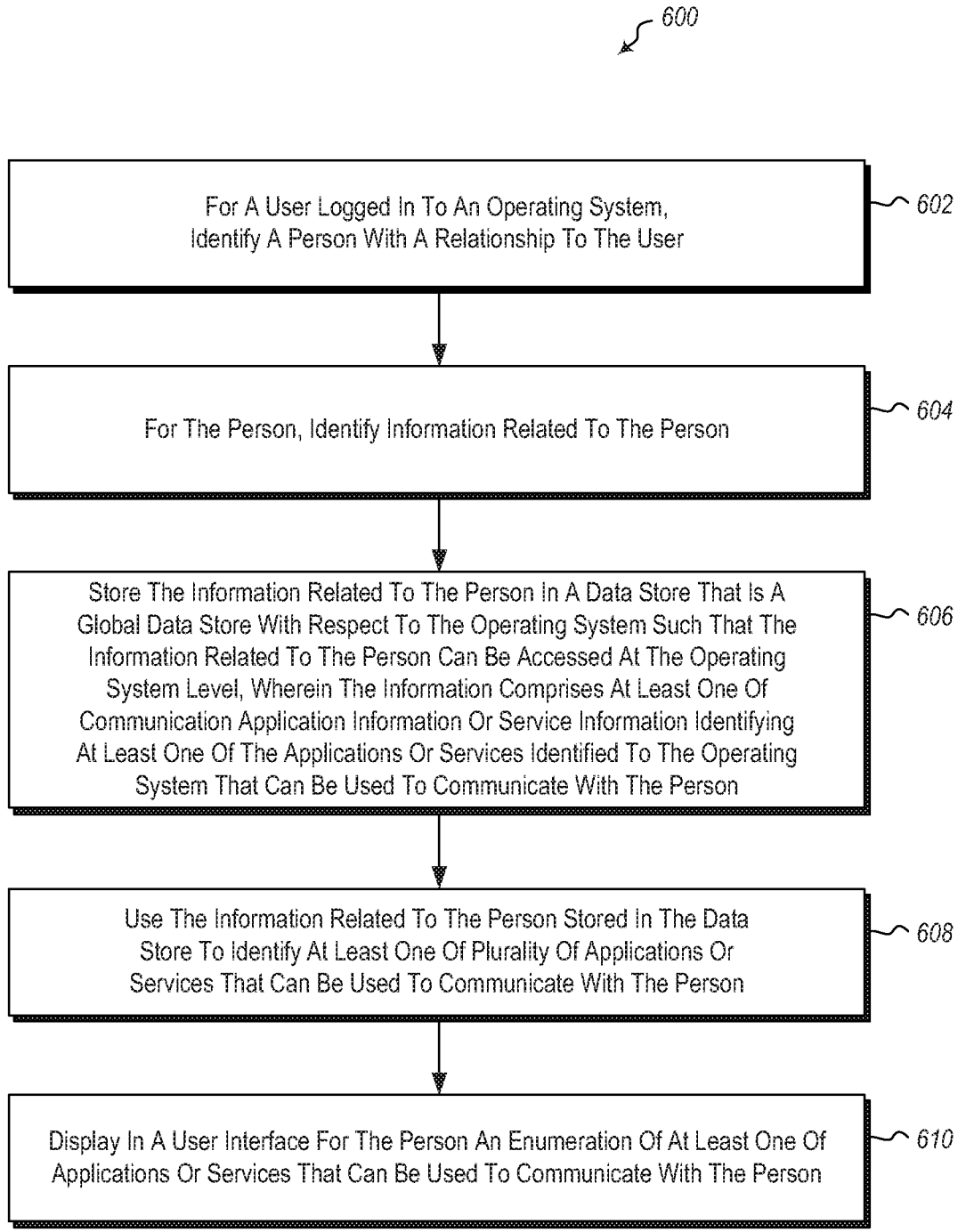
FIG. 6 illustrates a method of implementing people as operating system level objects.

Referring now to FIG. 6, a method 600 is illustrated. The method may be practiced in a computing environment. The method includes acts for implementing people as operating system level objects. The method includes for a user logged in to an operating system, identifying a person with a relationship to the user (act 602). For example, a person may be identified from a people application 110-P as illustrated in FIG. 1.

The method 600 further includes for the person, identifying information related to the person (act 604). For example, as illustrated above, embodiments may identify personal information about the person, applications that can be used to communicate with the person, services that can be used to communicate with the person, metadata that is stored about the person in various files on the system, etc.

The method 600 further includes storing the information related to the person in a data store that is a global data store with respect to the operating system such that the information related to the person can be accessed at the operating system level (act 606). For example as illustrated in FIG. 2, information about a person can be stored in a database 204 or as illustrated in FIG. 3, information about a person can be stored in an object graph 304. In alternative embodiments, information may be stored about a person in operating-system-level configuration files.

Figure 4E:
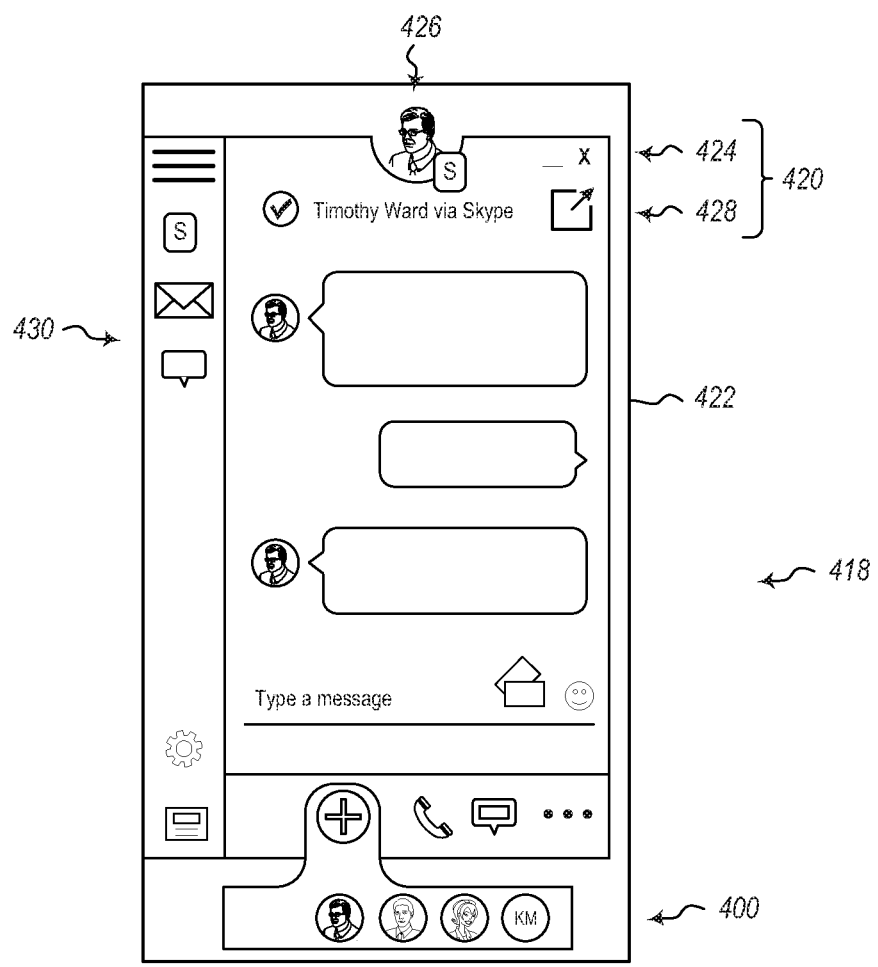
FIG. 4E illustrates an example of the people panel.

The method 600 further includes using the information related to the person stored in the data store to identify a plurality of applications or services that can be used to communicate with the person (act 608). For example as illustrated in FIG. 4E at 430, applications can be identified that can be used to interact with that person.

The method 600 further includes displaying in a user interface for the person, an enumeration of applications or services that can be used to communicate with the person (act 610). Again, as illustrated in FIG. 4E at 430, the various applications that can be used to contact a person can be illustrated in a user interface.

The method 600 may be practiced where the information comprises communication application information identifying applications identified to the operating system that can be used to communicate with the person. For example, various applications that can be used to contact a person may be stored in the database 204 illustrated in FIG. 2, the object graph 304 illustrated in FIG. 3, in one or more configuration files configured for operating-system-level storage, or in some other operating-system-level storage.

The method 600 may be practiced where the information comprises collaboration application information identifying applications identified to the operating system that can be used to collaborate with the person. For example, as described previously, applications may be identified in operating-system-level storage that can be used by a user at the system to collaborate with the person such as word processing applications, spreadsheet applications, or other collaboration applications.

The method 600 may be practiced where the information comprises file information identifying files registered with the operating system that have metadata associated with them identifying the person. For example, embodiments may store in operating-system-level storage information identifying image files that have been tagged with the person. Alternatively or additionally, embodiments may store information identifying documents that the person authored.

The method 600 may be practiced where the data store comprises a registry, and wherein the person is represented in a key within the registry. Thus, as illustrated in FIG. 2, a person may be represented in the database 204 such as is illustrated at 224.

The method 600 may be practiced where the data store comprises an object graph, and wherein the person is represented in a node of the object graph. An example of this is illustrated in FIG. 3.

The method 600 may be practiced where the data store comprises a preference construct where people are preferences in the preference construct.

The method 600 may be practiced where the operating system is a cloud based operating system, and the data store is distributed in the cloud based operating system.

The method 600 may be practiced where the data store comprises a persistence framework storing various categories of data, and wherein the person is represented in a category of the persistence framework.

Figure 7:
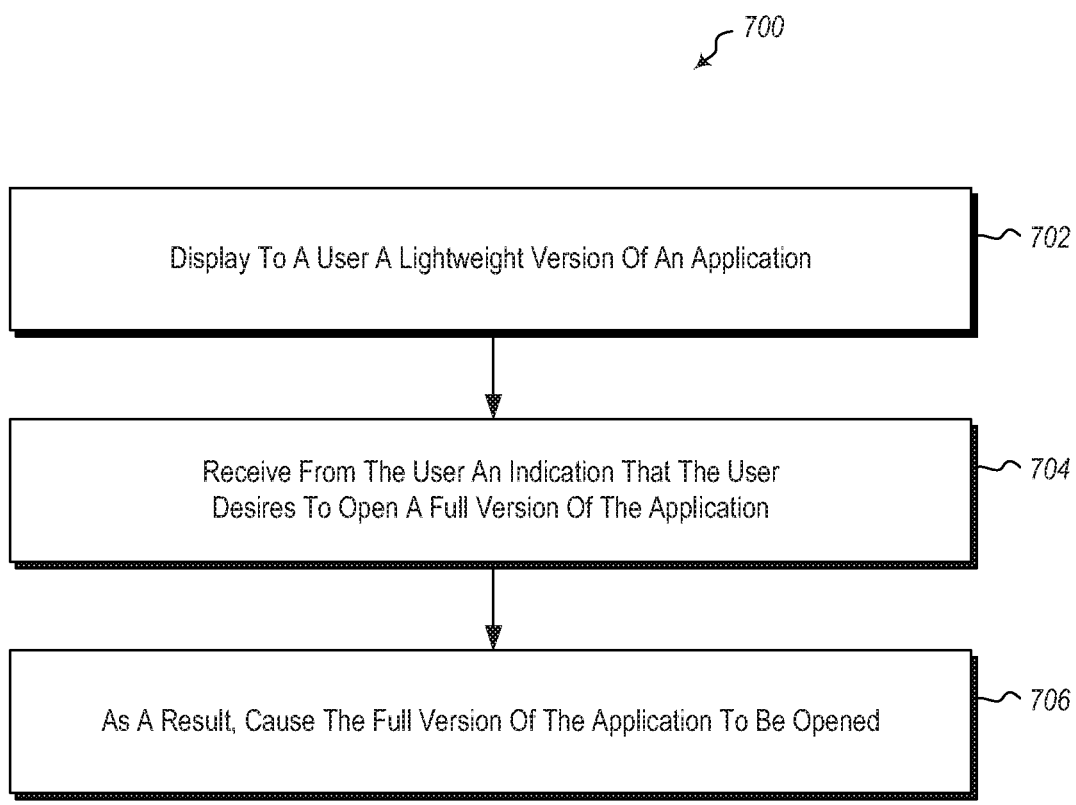
FIG. 7 illustrates a method of implementing applications on one or more systems

Referring now to FIG. 7, a method 700 is illustrated. The method 700 may be practiced in a computing environment. The method includes acts for implementing applications on one or more systems.

The method 700 includes displaying to a user a lightweight version of an application (act 702). For example, FIG. 5A illustrates a lightweight version 502 of an application being displayed to a user on a system 500.

The method 700 includes receiving from the user an indication that the user desires to open a full version of the application (act 704). For example, as illustrated in FIG. 5A, a user can select the entry point 508 in a user interface indicating that the user wishes to open the full version of the application.

The method 700 includes as a result, causing the full version of the application to be opened (act 706). For example, as illustrated in FIG. 5B, the full version 510 of the application is opened and displayed to a user. Note that in some embodiments, the full version 510 of the application may have been dormant with code from the full version 510 of the application not running even though the lightweight version 502 of the application was running.

The method 700 may be practiced where the lightweight version of the application and the full version of the application use alternate code paths in their implementations. For example, the minimized version may be the Android mobile version of the app while the full version may be the full Windows version. Another different alternative is the minimized app may be a trial version (or other light on features version) and the full app is full featured but requires a license fee or in app purchase.

The method 700 may further include passing application context and data from the lightweight version of the application to the full version of the application. Thus as illustrated in FIGS. 5A and 5B, context and data, such as information used in sending an e-mail, can be transferred from the lightweight version 502 of the application to the full-version 510 of the application such that the full version 510 of the application will open with context and data maintained from the light version 502 of the application.

The method 700 may be practiced where the lightweight version of the application is running on a first device and wherein causing the full version of the application to be opened causes the full version of the application to be opened on a second device. Thus for example, a user may be using the lightweight version of an application on a mobile phone device and may indicate that the full-version of the application should be opened. When the full-version of the application is opened, it may be opened on a desktop device instead of on the mobile phone device.

The method 700 may be practiced where displaying to a user the lightweight version of the application is performed by displaying the lightweight version of the application associated with a toolbar. For example, as illustrated in FIG. 4E the people panel 418 is launched by interacting with the toolbar 400. In this example, the people panel 418 as a lightweight version of a people application.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
one or more processor(s); and
one or more computer-readable hardware storage device(s) having stored thereon instructions that are executable by the one or more processor(s) to configure the computer system to modify an operating system, which comprises operating system level constructs, including one or more of an operating system (OS) configuration data store, files, applications, directories, or folders, to now additionally include a person-related directory associated with an identified person and to configure said person-related directory to operate in a manner corresponding to operations of the operating system level constructs by causing the computer system to perform at least the following:
for a user logged in to the operating system, identify a person with a relationship to the user;
for the person, identify information related to the person;
access an operating system level global data store comprising a configuration file of the operating system level constructs for the operating system, the operating system level global data store comprising the one or more of the OS configuration data store, files, applications, directories, or folders of the operating system;
create the person-related directory by using the OS configuration data store to register a new entry that stores the information related to the person in one or more registry keys associated with the OS configuration data store of the operating system level global data store such that the person-related directory, including the information in the new entry, is stored with, and can be accessed with, the operating system level constructs of the operating system, wherein the information comprises at least one of communication application information or service information identifying at least one of applications or services identified to the operating system that can be used to communicate with the person;
display in a user interface an enumeration of the at least one of the applications or services that can be used to communicate with the person; and
create, within the person-related directory and as a part of the new entry, a specific OS configuration data store key that is configured to list certain identified applications that are identified as storing metadata about the person.

2. The computer system of claim 1, wherein the information comprises at least one of collaboration application or service information identifying the at least one of the applications or services identified to the operating system that can be used to collaborate with the person.

3. The computer system of claim 1, wherein the information comprises file information identifying files registered with the operating system that have metadata usable to identify the person.

4. The computer system of claim 1, wherein the operating system level global data store comprises an object graph, and wherein the person is represented as a node in the object graph.

5. The computer system of claim 1, wherein the operating system level global data store comprises a preference construct where people are preferences in the preference construct.

6. The computer system of claim 1, wherein the operating system is a cloud based operating system, and the operating system level global data store is distributed in the cloud based operating system.

7. The computer system of claim 1, wherein the operating system level global data store comprises a persistence framework storing various categories of data, and wherein the person is represented in a category of the persistence framework.

8. A method of modifying an operating system, which comprises operating system level constructs, including one or more of an operating system (OS) configuration data store, files, applications, directories, or folders, to now additionally include a person-related directory associated with an identified person and to configure said person-related directory to operate in a manner corresponding to operations of the operating system level constructs, said method being performed by a computer system and comprising:
for a user logged in to the operating system, identifying a person with a relationship to the user;
for the person, identifying information related to the person;
access an operating system level global data store, located at the computer system, comprising a configuration file of the operating system level constructs for the operating system, the operating system level global data store comprising the one or more of the OS configuration data store, files, applications, directories, or folders of the operating system;
creating the person-related directory by using the OS configuration data store to register a new entry that stores the information related to the person in one or more registry keys associated with the OS configuration data store of the operating system level global data store such that the person-related directory, including the information in the new entry, is stored with, and can be accessed with, the operating system level constructs of the operating system, wherein the information comprises at least one of communication application information or service information identifying at least one of applications or services identified to the operating system that can be used to communicate with the person;
displaying in a user interface an enumeration of the at least one of the applications or services that can be used to communicate with the person; and
creating, within the person-related directory and as a part of the new entry, a specific OS configuration data store key that is configured to list certain identified applications that are identified as storing metadata about the person.

9. The computer system of claim 1, wherein the at least one of the applications or services are installed applications or services that are installed on the computer system such that the operating system level global data store identifies the installed applications or services, and
wherein the operating system level global data store additionally identifies an uninstalled application that is not currently installed on the computer system and that can also be used to communicate with the person via a separate computer system such that the operating system level global store identifies both the installed applications or services and the uninstalled application.

10. The computer system of claim 1, wherein the user interface visualizes a strength of relationship between the user and the person, and wherein the strength of the relationship is visualized by highlighting an icon of the person in a people bar.

11. The computer system of claim 1, wherein the instructions are executable to further cause the computer system to:
infer that the user has a stronger relationship with the person as compared to a second person based on a tracked number of communication connections the user has with the person relative to a tracked number of communication connections the user has with the second person.

12. The method of claim 8, wherein the information comprises at least one of collaboration application or service information identifying the at least one of the applications or services identified to the operating system that can be used to collaborate with the person.

13. The method of claim 8, wherein the information comprises file information identifying files registered with the operating system that have metadata usable to identify the person.

14. The method of claim 8, wherein the operating system level global data store comprises an object graph, and wherein the person is represented as a node in the object graph.

15. The method of claim 8, wherein the operating system level global data store comprises a preference construct where people are preferences in the preference construct.

16. The method of claim 8, wherein the operating system is a cloud based operating system, and the operating system level global data store is distributed in the cloud based operating system.

17. The method of claim 8, wherein the operating system level global data store comprises a persistence framework storing various categories of data, and wherein the person is represented in a category of the persistence framework.

18. The method of claim 8, further comprising indicating a strength of relationship between the person and the user in the user interface.

19. The method of claim 8, further comprising displaying communication history between the person and the user.

20. A computer system configured to modify an operating system, which comprises operating system level constructs, including one or more of an operating system (OS) configuration data store, files, applications, directories, or folders, to now additionally include a person-related directory associated with an identified person and to configure said person-related directory to operate in a manner corresponding to operations of the operating system level constructs, said computer system comprising:

the operating system, which is installed at the computer system;

a data store that is a global data store with respect to the operating system, wherein the data store comprises a configuration file of the operating system level constructs for the operating system, the data store comprising the one or more of the OS configuration data store, files, applications, directories, or folders of the operating system and being configured to use the OS configuration data store to register a new entry that stores information related to a person with a relationship to a user of the operating system in one or more registry keys associated with the OS configuration data store, such that storing the information related to the person creates the person-related directory and such that the information is stored with, and can be accessed with, the operating system level constructs of the operating system, wherein the information comprises communication application information identifying applications identified to the operating system that can be used to communicate with the person; and a user interface coupled to the operating system, wherein the user interface is configured to display an enumeration of the applications that can be used to communicate with the person, and wherein a specific OS configuration data store key is created within the person-related directory as a part of the new entry, said specific OS configuration data store key being configured to list certain identified applications that are identified as storing metadata about the person.

21. The computer system of claim 20, wherein the operating system is a cloud based operating system, and the data store is distributed in the cloud based operating system.

* * * * *